(12) United States Patent
Iyer et al.

(10) Patent No.: US 8,001,318 B1
(45) Date of Patent: Aug. 16, 2011

(54) WEAR LEVELING FOR LOW-WEAR AREAS OF LOW-LATENCY RANDOM READ MEMORY

(75) Inventors: Rahul N. Iyer, Sunnyvale, CA (US); Garth R. Goodson, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 466 days.

(21) Appl. No.: 12/260,013

(22) Filed: Oct. 28, 2008

(51) Int. Cl.
*G06F 12/16* (2006.01)
*G06F 11/22* (2006.01)

(52) U.S. Cl. ......... 711/103; 711/104; 711/162; 714/6.1; 714/6.32

(58) Field of Classification Search .............. None
See application file for complete search history.

(56) References Cited

U.S. PATENT DOCUMENTS

| | | | | |
|---|---|---|---|---|
| 6,000,006 | A * | 12/1999 | Bruce et al. .......... | 711/103 |
| 2007/0150689 | A1 * | 6/2007 | Pandit et al. .......... | 711/170 |
| 2008/0276038 | A1 * | 11/2008 | Tanaka et al. .......... | 711/103 |
| 2008/0282024 | A1 * | 11/2008 | Biswas et al. .......... | 711/103 |
| 2008/0301256 | A1 * | 12/2008 | McWilliams et al. ..... | 709/214 |

OTHER PUBLICATIONS

Eran Gal and Sivan Toledo, Algorithms and Data Structures for Flash Memories, ACM Computing Surveys (CSUR) Archive, Jun. 2005, pp. 138-163, vol. 37, Issue 2, Publisher ACM, New York City, NY, USA.

* cited by examiner

*Primary Examiner* — Than Nguyen
(74) *Attorney, Agent, or Firm* — Stattler-Suh PC

(57) ABSTRACT

Described herein are method and apparatus for performing wear leveling of erase-units of an LLRRM device that considers all active erase-units. Wear counts of all active erase-units (containing client data) and free erase-units (not containing client data) are tracked. Wear counts are used to determine low-wear active erase-units having relatively low wear counts and high-wear free erase-units having relatively high wear counts. In some embodiments, data contents of low-wear active erase-units are transferred to high-wear free erase-units, whereby the low-wear active erase-units are converted to free erase-units and may later store different client data which may increase the current rate of wear for the erase-unit. The high-wear free erase-units are converted to active erase-units that store client data that is infrequently erased/written, which may reduce the current rate of wear for the erase-unit. As such, wear is spread more evenly among erase-units of the LLRRM device.

27 Claims, 11 Drawing Sheets

| LBN range | Erase-Unit |
|---|---|
| 0-99 | 0 |
| 100-199 | 3 |
| 200-299 | 1 |
| 300-399 | 6 |

Remapping Data Structure 610

Fig. 6

WEAR LEVELING FOR LOW-WEAR AREAS OF LOW-LATENCY RANDOM READ MEMORY

FIELD OF THE INVENTION

The present invention relates to storage systems, and particularly, to wear leveling for low-wear areas of low-latency random read memory.

BACKGROUND OF THE INVENTION

A storage system is a processing system adapted to store and retrieve data on storage devices (such as disks). The storage system includes a storage operating system that implements a file system to logically organize the data as a hierarchical structure of directories and files on the storage devices. Each file may be implemented as a set of blocks configured to store data (such as text), whereas each directory may be implemented as a specially-formatted file in which data about other files and directories are stored. The storage operating system may assign/associate a unique storage system address (e.g., logical block number (LBN)) for each data block stored in the storage system.

The storage operating system generally refers to the computer-executable code operable on a storage system that manages data access and access requests (read or write requests requiring input/output operations) and may implement file system semantics in implementations involving storage systems. In this sense, the Data ONTAP® storage operating system, available from NetApp, Inc. of Sunnyvale, Calif., which implements a Write Anywhere File Layout (WAFL®) file system, is an example of such a storage operating system implemented as a microkernel within an overall protocol stack and associated storage. The storage operating system can also be implemented as an application program operating over a general-purpose operating system, such as UNIX® or Windows®, or as a general-purpose operating system with configurable functionality, which is configured for storage applications as described herein.

A storage system's storage is typically implemented as one or more storage volumes that comprise physical storage devices, defining an overall logical arrangement of storage space. Available storage system implementations can serve a large number of discrete volumes. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace.

A storage system may be configured to allow server systems to access its contents, for example, to read or write data to the storage system. A server system may execute an application that "connects" to the storage system over a computer network, such as a shared local area network (LAN), wide area network (WAN), or virtual private network (VPN) implemented over a public network such as the Internet. The application executing on the server system may send an access request (read or write request) to the storage system for accessing particular data stored on the storage system.

The storage system may typically implement large capacity disk devices for storing large amounts of data. In conjunction with the large capacity disk devices, the storage system may also store data on other storage devices, such as low-latency random read memory (referred to herein as "LLRRM"). When using LLRRM devices in conjunction with disk devices to store data, the storage system may map storage system addresses (e.g., LBNs) to LLRRM addresses to access data on the LLRRM devices. An LLRRM device may be sub-divided into a plurality of storage areas referred to as erase-units, each erase-unit configured for storing a predetermined amount of data. An erase-unit containing valid or useful client data is referred to as an "active" erase-unit. An erase-unit not containing valid or useful client data is referred to as a "free" erase-unit. An active erase-unit is considered to be allocated for use, whereas a free erase-unit is considered to be unallocated.

Typically, each erase-unit of an LLRRM device has a maximum number of erase cycles (maximum wear) that may be performed before the erase-unit begins exhibiting a high-frequency of errors and becomes unusable. For example, the maximum wear of an erase-unit may be approximately 100,000 erase cycles. As more erase-units reach the maximum wear, more erase-units become unusable and the storage size of the LLRRM device continually decreases over time. As such, there is a need for a "wear leveling" method and apparatus to spread wear more evenly among different erase-units of the LLRRM device in a simple and efficient manner.

SUMMARY OF THE INVENTION

Described herein are method and apparatus for providing wear leveling of erase-units of the LLRRM device that considers all active erase-units (having client data). In some embodiments, all erase units of an LLRRM device are considered to determine active erase-units that have been erased/written relatively infrequently (referred to as "low-wear" active erase-units having relatively low wear counts) and free erase-units (not having client data) that have been erased/written relatively frequently (referred to as "high-wear" free erase-units having relatively high wear counts). An active erase-unit may have a low wear count because the client data stored in the active erase-unit has not been overwritten in some time (i.e., is "cold"). In some embodiments, the client data of low-wear active erase-units are transferred to high-wear free erase-units. Thus a low-wear active erase-unit may be converted to a free erase-unit, which puts the active erase-unit back into circulation for use in the LLRRM device, whereby it may later store different client data that is frequently overwritten (i.e., is "hot"). As such, the current rate of wear for the erase-unit may be increased. Further, a high-wear free erase-unit may be converted to an active erase-unit that stores client data that is infrequently erased/written, which may thereby reduce the current rate of wear for the erase-unit. As such, some embodiments herein spread wear more evenly among erase-units by reducing the current wear rate of low-wear active erase-units and increasing the current wear rate of high-wear free erase-units.

In some embodiments, the LLRRM device is implemented in a storage system. The storage system may store a plurality of data blocks, each data block having an associated unique storage system address (e.g., LBN) in the storage system. In some embodiments, the wear leveling method is implemented by a wear leveling module that resides in the storage operating system. In particular, the wear leveling module may reside in a remapping layer of the storage operating system, the remapping layer for mapping storage system addresses (e.g., LBNs) to LLRRM addresses to access data on the LLRRM device.

In some embodiments, an LLRRM device comprises a non-volatile, rewritable computer memory having lower latency in performing random read requests relative to disk devices. In some embodiments, an LLRRM device comprises a solid state memory device having no mechanical moving parts for reading and writing data. In some embodiments, the LLRRM device comprises a plurality of erase-units, each erase-unit having an associated identifier that uniquely identifies the erase-unit within the LLRRM device. Each erase-unit may also have an associated wear count that indicates the number of times the erase-unit has been erased (i.e., the current number of erase cycles performed on the erase-unit).

In some embodiments, the wear leveling module produces and maintains a wear-count (WC) table for active erase-units (referred as the "active WC table") and a wear-count table for free erase-units (referred as the "free WC table"). The active WC table comprises a plurality of entries, wherein each active erase-unit in the LLRRM device is represented by an entry in the active WC table. In particular, an entry is produced for each active erase-unit (containing client data) in the LLRRM device, the entry containing the identifier and the wear count associated with the active erase-unit. The free WC table comprises a plurality of entries representing a plurality of free erase-units in the LLRRM device (where each free erase-unit in the LLRRM device may be represented by an entry in the free WC table). In particular, an entry is produced for a free erase-unit (not containing client data) in the LLRRM device, the entry containing the identifier and the wear count associated with the free erase-unit. In some embodiments, the entries in the active and free WC tables are sorted/listed in order according to wear count values.

The wear leveling module may then use the information in the active and free WC tables to: 1) determine when to initiate/trigger wear leveling; 2) select one or more pairs of active and free erase-units for wear leveling; and 3) determine when to stop wear leveling. In some embodiments, wear leveling may be initiated when the variance between two predetermined wear counts in the active and free WC tables exceeds a predetermined variance threshold. For example, wear leveling may be initiated when the difference/variance between the lowest and highest wear count values in the WC tables exceed a predetermined variance threshold (e.g., a 20% variance threshold). In other embodiments, wear leveling may be initiated when the variance between the lowest wear count value in the active WC table and the highest wear count value in the free WC table exceed a predetermined variance threshold. In further embodiments, wear leveling may be initiated when a predetermined variance threshold has been exceeded and the total number of erase cycles performed on the entire LLRRM device has exceeded a predetermined total cycle threshold.

Once wear leveling is initiated/triggered, the wear leveling module may then perform wear leveling on one or more pairs of erase-units of the LLRRM device. In some embodiments, wear leveling may be performed on a pair of erase-units comprising an active erase-unit and a free erase-unit, whereby client data of the active erase-unit is copied to the free erase-unit, the active erase-unit is converted to a free erase-unit (by removing the entry for the active erase-unit from the active WC table and adding the entry to the free WC table), and the free erase-unit is converted to an active erase-unit (by removing the entry for the free erase-unit from the free WC table and adding the entry to the active WC table).

The wear leveling may be performed on a pair of erase-units that are selected using the information in the active and free WC tables. For example, in some embodiments, the wear leveling may be performed on a pair of erase-units comprising an active erase-unit with the lowest wear count in the active WC table and a free erase-unit with the highest wear count in the free WC table. In other embodiments, the pair of erase-units may comprise an active erase-unit with a relatively low wear count in the active WC table (such as a wear count within the lowest 10% of wear counts) and a free erase-unit with a relatively high wear count in the free WC table (such as a wear count within the highest 10% of wear counts).

Wear leveling may continue to be performed on pairs of erase-units (selected using the active and free WC tables) until a predetermined termination event occurs. In some embodiments, the occurrence of the termination event is determined using the information in the active and free WC tables. For example, in some embodiments, wear leveling may continue on selected pairs of erase-units until the variance between the lowest and highest wear count values in the active and free WC tables becomes equal to or less than the predetermined variance threshold (which comprises the termination event). As such, the maximum wear variance between the erase-units may be bounded (as determined by the variance threshold).

Due to the maximum wear characteristics of erase-units of an LLRRM device, wear leveling may used to help distribute wear (i.e., the number of erase cycles) evenly among the erase-units to preserve the full storage size of the LLRRM device. In some embodiments, a wear leveling method is provided that converts low-wear active erase-units (having relatively low wear counts) to free erase-units that may later store different client data, which may thereby increase the current rates of wear for these erase-units. Further, high-wear free erase-units (having relatively high wear counts) may be converted to active erase-units that store client data that are infrequently erased/written, which may thereby reduce the current rates of wear for these erase-units. As such, some embodiments herein spread wear more evenly among erase-units by reducing the current wear rates of low-wear active erase-units and increasing the current wear rates of high-wear free erase-units.

BRIEF DESCRIPTION OF THE DRAWINGS

FIG. 6 shows a conceptual diagram of examples of a remapping data structure used to map a storage system address to an LLRRM address;

DETAILED DESCRIPTION

In the following description, numerous details are set forth for purpose of explanation. However, one of ordinary skill in the art will realize that the embodiments described herein may be practiced without the use of these specific details. In other instances, well-known structures and devices are shown in block diagram form in order not to obscure the description with unnecessary detail.

The description that follows is divided into three sections. Section I describes a storage system environment in which some embodiments operate. Section II describes a storage operating system having a remapping layer for using LLRRM as a storage device in a storage system. Section III describes performing wear leveling on selected erase-units of an LLRRM device.

I. Storage System Environment

Figure 1:
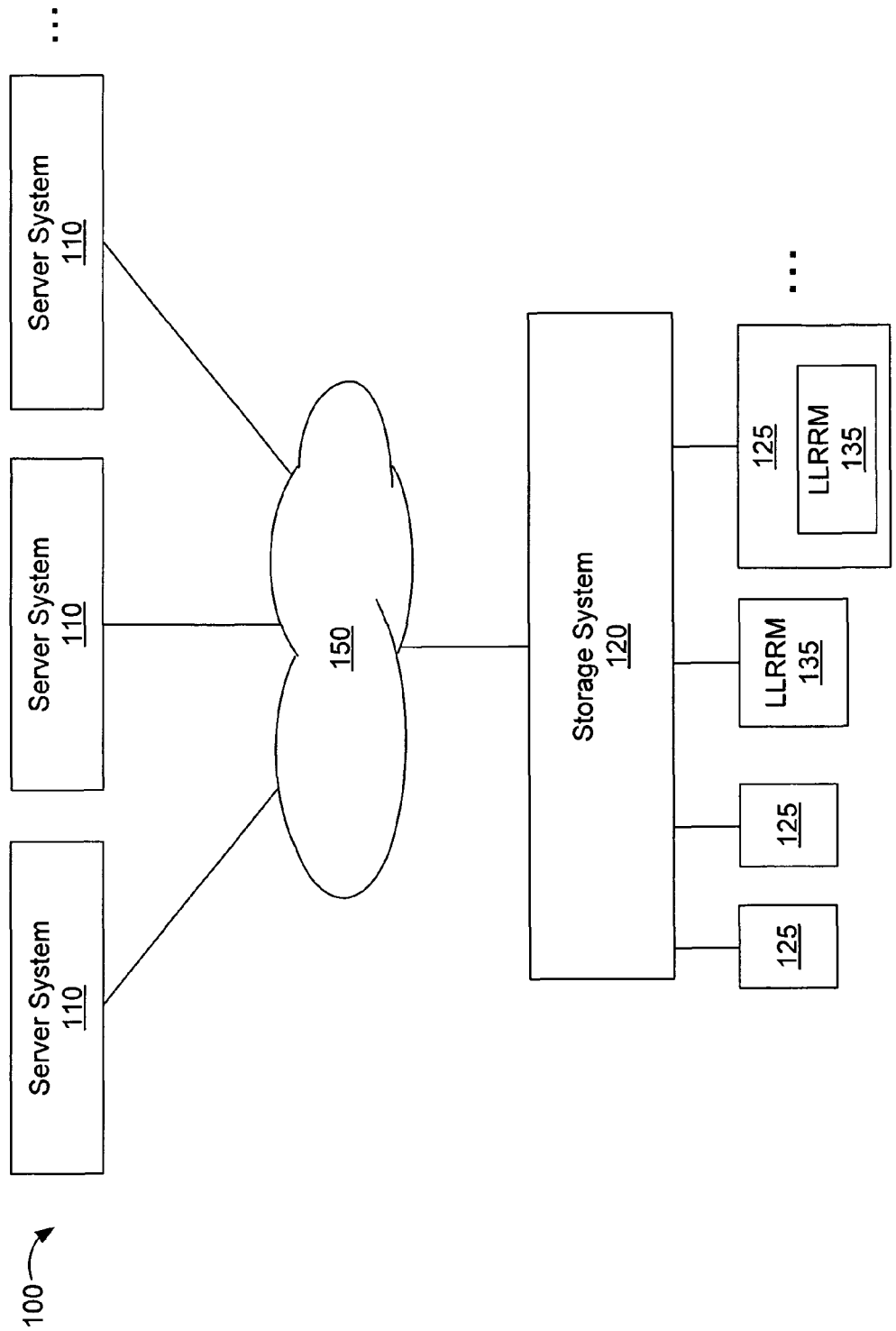
FIG. 1 is a schematic block diagram of an exemplary storage system environment in which some embodiments operate.

FIG. 1 is a schematic block diagram of an exemplary storage system environment 100 in which some embodiments operate. The environment 100 comprises a one or more server systems 110 and a storage system 120 that are connected via a connection system 150. The storage system 120 may comprise a set of storage devices, such as one or more primary storage devices 125 and/or one or more secondary storage devices 135. The connection system 150 may comprise a network, such as a Local Area Network (LAN), Wide Area Network (WAN), metropolitan area network (MAN), the Internet, or any other type of network or communication system between computer systems.

A server system 110 may comprise a computer system that utilizes services of the storage system 120 to store and manage data in the storage devices of the storage system 120. As such, in some embodiments, the server system 110 may also be referred to as a client system that utilizes services of the storage system 120. A server system 110 may execute one or more client applications that submit access requests for accessing particular data on the storage devices 125 and/or 135 of the storage system 120. Interaction between a server system 110 and the storage system 120 can enable the provision of storage services. That is, server system 110 may request the services of the storage system 120 (e.g., through read or write requests), and the storage system 120 may return the results of the services requested by the server system 110, by exchanging packets over the connection system 150. In particular, the server system 110 may submit write requests to the storage system 120, the write requests containing client data (e.g., received from client applications) to be stored on the storage devices 125 and/or 135 of the storage system 120.

The server system 110 may request the services of the storage system by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the server system 110 may issue packets including block-based access protocols, such as the Fibre Channel Protocol (FCP), or Internet Small Computer System Interface (iSCSI) Storage Area Network (SAN) access, when accessing information in the form of blocks.

The storage system 120 may comprise a computer system that stores client data in a set of one or more primary storage devices 125. A primary storage device 125 may comprise a writable storage device media, such as magnetic disks, video tape, optical, DVD, magnetic tape, and any other similar media adapted to store information (including data and parity information). For illustrative purposes, the primary storage device 125 is sometimes described herein as a disk. In some embodiments, the storage system 120 also stores client data in a set of one or more secondary storage devices 135, a secondary storage device 135 comprising an LLRRM device. The storage system 120 may use the LLRRM devices 135 in conjunction with the primary storage devices 125 to store data. In other embodiments, the storage system 120 may use only the LLRRM devices 135 to store data without use of the primary storage devices 125.

The LLRRM device may comprise a separate (stand-alone) storage device 135 or may be integrated as part of a primary storage device 125 (such as a hybrid drive comprising an LLRRM and a magnetic storage combined in a single device). As discussed below in relation to FIG. 2, an LLRRM device may also reside in the storage system's internal architecture and be connected with the system bus (e.g., as an LLRRM module on a card). The storage system may utilize the LLRRM in a similar manner, regardless of the configuration or location of the LLRRM, so that the LLRRM device(s) 135 and/or primary storage device(s) 125 operate together in a way that is transparent to client applications accessing data stored on the storage system 120.

In some embodiments, an LLRRM comprises a non-volatile, rewritable computer memory (i.e., a computer memory that does not require power to maintain information stored in the computer memory and may be electrically erased and reprogrammed) having lower latency in performing random-read requests relative to disk devices. As known in the art, a disk device comprises mechanical moving components for reading and writing data (such as platters and the read/write head). In some embodiments, an LLRRM device comprises a non-volatile rewritable solid state memory device having no mechanical moving parts for reading and writing data. Some examples of LLRRM devices include flash memory, non-volatile random access memory (NVRAM), Magnetic Random Access Memory (MRAM), Phase Change RAM (PRAM), etc. In other embodiments, other LLRRM devices are used other than those listed here.

Although LLRRM may be more costly (for a given amount of data storage) than disk devices, data may be accessed on an LLRRM with higher performance (e.g., lower power consumption and/or lower latency) than on disk devices. In some embodiments, LLRRM 135 may be used as a permanent storage device (alone or in conjunction with primary storage devices 125), rather than as a temporary storage device (e.g., as a cache device). Typically, the storage areas (erase-units) of an LLRRM device 135 has a maximum number of erase cycles (maximum wear) that may be performed before the erase-unit becomes unusable. As more erase-units reach the maximum wear, the storage size of the LLRRM device continually decreases over time. As such, wear leveling methods have been developed to spread wear more evenly among different storage areas of the LLRRM device 135.

The storage system 120 may implement a file system to logically organize the data as a hierarchical structure of directories and files on each primary and secondary storage device 125 and 135. Each file may be implemented as a set of blocks configured to store data, whereas each directory may be implemented as a specially-formatted file in which information about other files and directories are stored. A block of a file may comprise a fixed-sized amount of data that comprises the smallest amount of storage space that may be accessed (read or written) on a storage device 125. The block may vary widely in data size (e.g., 1 byte, 4-kilobytes (KB), 8 KB, etc.).

The storage operating system may assign/associate a unique storage system address (e.g., logical block number (LBN)) for each data block stored in the storage system. The unique storage system address for a data block may be used by the storage operating system to locate and access (read/write) the data block. In some embodiments, the unique storage system address is referred to as a logical block number (LBN) or a logical block address (LBA). In other embodiments, the storage system address may be expressed in any variety of forms (e.g., logical volume block number, etc.), as long as the storage system address uniquely identifies an address of a data block.

When implementing one or more LLRRM devices 135 for storing data, the storage system 120 may map storage system addresses to LLRRM addresses for locating and accessing data stored on the LLRRM devices 135. The storage system may implement any variety of remapping methods known in the art to do so. The storage system addresses may be used by the file system to locate and access data blocks of the file system, whereas LLRRM addresses may be used by the LLRRM devices 135 to locate and access data blocks stored on the LLRRM devices 135. The LLRRM devices 135 may receive LLRRM addresses and access data on the LLRRM devices 135 by implementing a sub-system for performing various input/output operations (such as reading, writing, or erasing data). The sub-system may comprise a device driver, file system, and/or other software layers for performing the various input/output operations.

Figure 2:
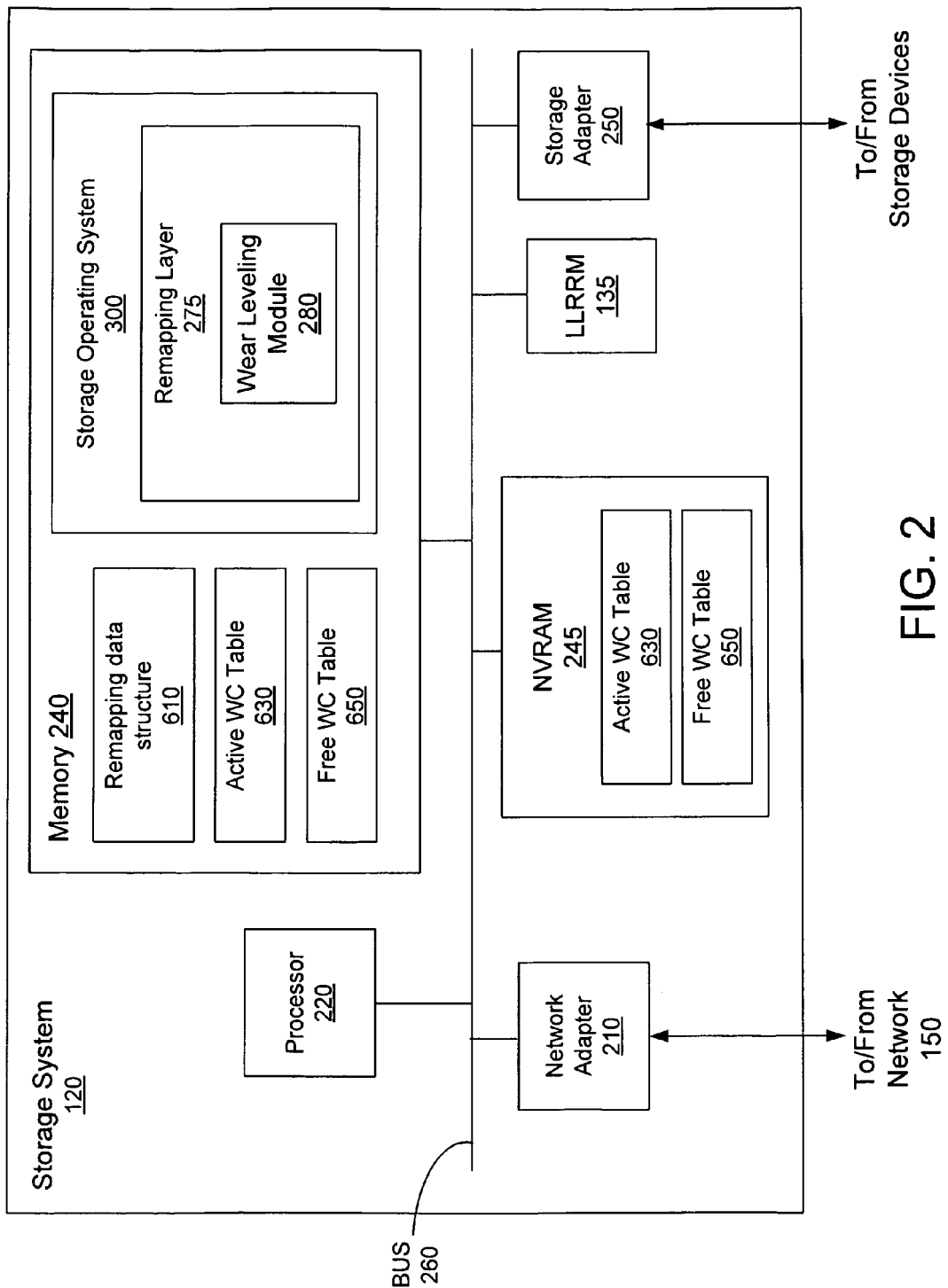
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. In some embodiments, the storage system 120 further comprises an LLRRM device 135 that resides in the storage system's internal architecture and is connected with the system bus 260. For example, the LLRRM device 135 may be an LLRRM module on a Peripheral Component Interconnect (PCI) or PCI eXtended (PCI-X) card that is connected with the system bus 260.

The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets).

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array (RAM) having either a back-up battery, or other built-in last-state-retention capabilities (e.g. an LLRRM), that holds the last state of the memory in the event of any power loss to the array. Therefore, even if an access request stored in memory 240 is lost or erased (e.g., due to a temporary power outage) it still may be recovered from the NVRAM 245. In other embodiments, in place of NVRAM 245, the storage system 120 may include any other type of non-volatile memory (such as flash memory, Magnetic Random Access Memory (MRAM), Phase Change RAM (PRAM), etc.).

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a remapping layer 275) that are executed by the processor 220. In some embodiments, the remapping layer 275 is implemented to remap storage system addresses (e.g., LBNs) to LLRRM addresses to use an LLRRM device as a storage device 135. In some embodiments, a wear leveling module 280 may reside in the remapping layer 275 of the storage operating system, the wear leveling module 280 configured for performing wear leveling methods described herein. The wear leveling module 280 may be pre-included in storage operating system software or comprise an external auxiliary plug-in type software module that works with the storage operating system to enhance its functions. Portions of the storage operating system 300 are typically resident in memory 240. It will be apparent to those skilled in the art, however, that other processing and memory means, including various computer readable media, may be used for storing and executing program instructions pertaining to the storage operating system 300.

The storage adapter 250 cooperates with the storage operating system 300 executing on the storage system 120 to access client data requested by the server system 110. The client data may be stored on the storage devices 125 and 135 that are attached, via the storage adapter 250, to the storage system 120 or other node of a storage system as defined herein. The storage adapter 250 includes input/output (I/O) interface circuitry that couples to the storage devices 125 and 135 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data is formatted into a packet and returned to the server system 110.

In an illustrative embodiment, the primary storage devices 125 may comprise disks that are arranged into a plurality of volumes, each having a file system associated therewith. In one embodiment, the storage devices 125 comprise disks that are configured into a plurality of RAID (redundant array of independent disks) groups whereby multiple primary storage devices 125 are combined into a single logical unit (i.e., RAID group). In a typical RAID group, primary storage devices 125 of the group share or replicate data among the disks which may increase data reliability or performance. The primary storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of primary storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

Figure 3:
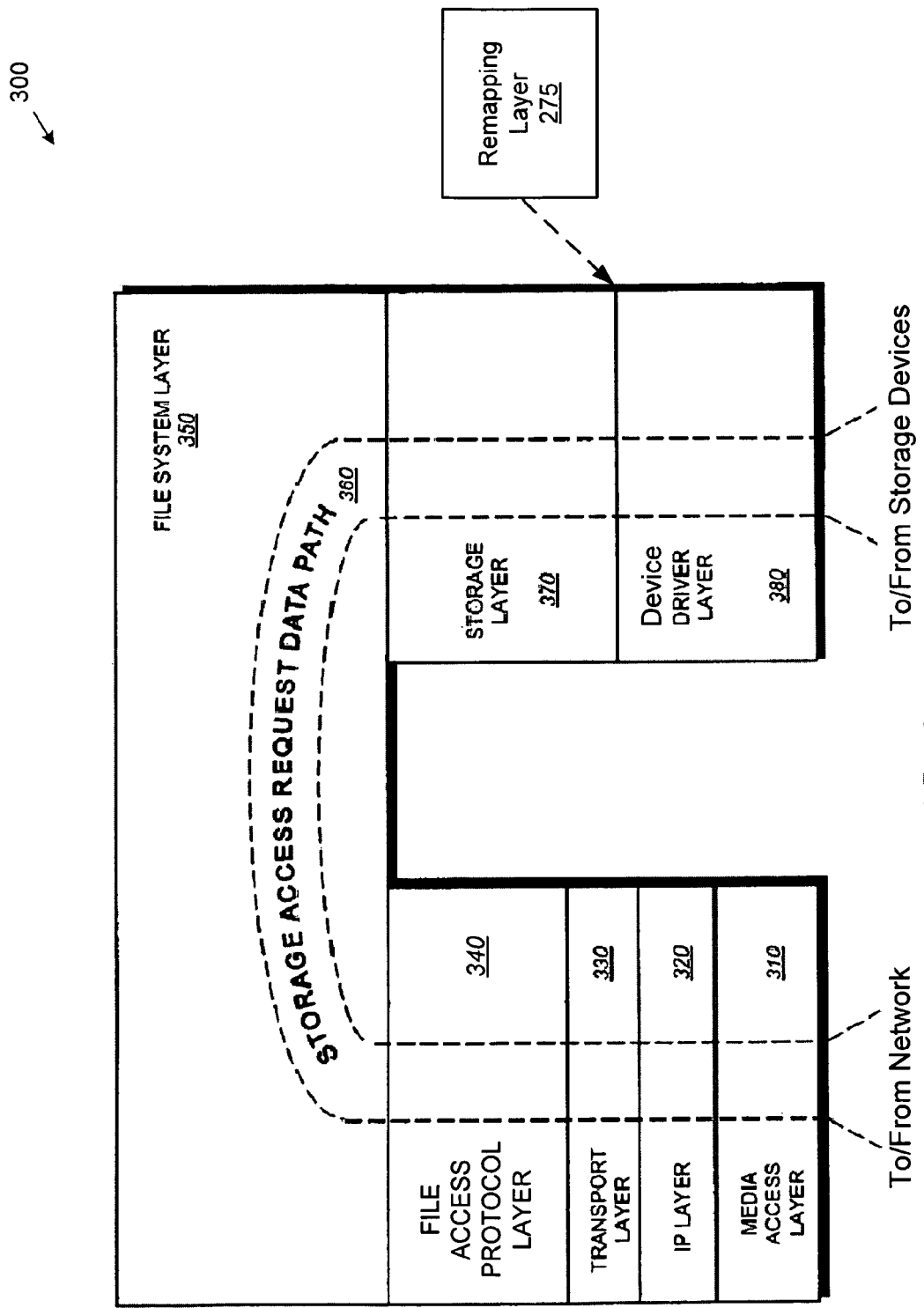
FIG. 3 is a schematic block diagram of an exemplary storage operating system that may be implemented by the storage system in FIG. 2.

As shown in FIG. 3, the storage operating system 300 comprises a series of software layers that form an integrated protocol software stack. The protocol stack provides data paths 360 for server systems 110 to access data stored on the storage system 120 using file-access protocols. The protocol stack includes a media access layer 310 of network drivers (e.g., an Ethernet driver). The media access layer 310 interfaces with network communication and protocol layers, such as the Internet Protocol (IP) layer 320 and the transport layer 330 (e.g., TCP/UDP protocol). The IP layer 320 may be used to provide one or more data access ports for server systems 110 to access the storage system 120. In some embodiments, the IP layer 320 layer provides a dedicated private port for each of one or more remote-file access protocols implemented by the storage system 120.

A file-access protocol layer 340 provides multi-protocol data access and, for example, may include support for the Hypertext Transfer Protocol (HTTP) protocol, the NFS protocol, and the CIFS protocol. The storage operating system 300 may include support for other protocols, including, but not limited to, the direct access file system (DAFS) protocol, the web-based distributed authoring and versioning (WebDAV) protocol, the Internet small computer system interface (iSCSI) protocol, and so forth. The storage operating system 300 may manage the primary storage devices 125 using a storage layer 370 that implements a storage protocol (such as a RAID protocol) and a device driver layer 380 that implements a device control protocol (such as small computer system interface (SCSI), integrated drive electronics (IDE), etc.).

Bridging the storage device software layers with the network and file-system protocol layers is a file system layer 350 of the storage operating system 300. In an illustrative embodiment, the file system layer 350 implements a file system having an on-disk format representation that is block-based using, for example, 4 KB data blocks. For each data block, the file system layer 350 may assign/associate a unique storage system address (e.g., a unique LBN) for storing data blocks in the set of storage devices. The file system layer 350 also assigns, for each file, a unique inode number and an associated inode. An inode may comprise a data structure used to store information about a file, such as ownership of the file, access permission for the file, size of the file, name of the file, location of the file, etc. Each inode may also contain information regarding the block locations of the file. In some embodiments, the block locations are indicated by LBNs assigned for each block of the file.

In response to receiving a file-access request, the file system generates operations to load (retrieve) the requested data from the storage devices. If the information is not resident in the storage system's memory 240, the file system layer 350 indexes into an inode using the received inode number to access an appropriate entry and retrieve a storage system address (e.g., LBN). The storage system address may then used by the file system layer 350, storage layer 370, and an appropriate driver of the device driver layer 380 to access the requested storage system address from the storage devices. The requested data may then be loaded in memory 240 for processing by the storage system 120. For a received write request containing client data to be stored on the storage devices at a specified storage system address, the storage system 120 may write the client data to the specified storage system address. Upon successful completion of the request, the storage system (and storage operating system) returns a response, e.g., a conventional acknowledgement packet defined by the CIFS specification, to the server system 110 over the network 150.

It should be noted that the software "path" 360 through the storage operating system layers described above needed to perform data storage access for the requests received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server system 110. Moreover, in a further embodiment, the processing elements of network and storage adapters 210 and 250 may be configured to offload some or all of the packet processing and storage access operations, respectively, from processor 220 to thereby increase the performance of the data access service provided by the storage system.

II. Remapping Layer for LLRRM Devices

A. Remapping Layer Overview

Figure 4:
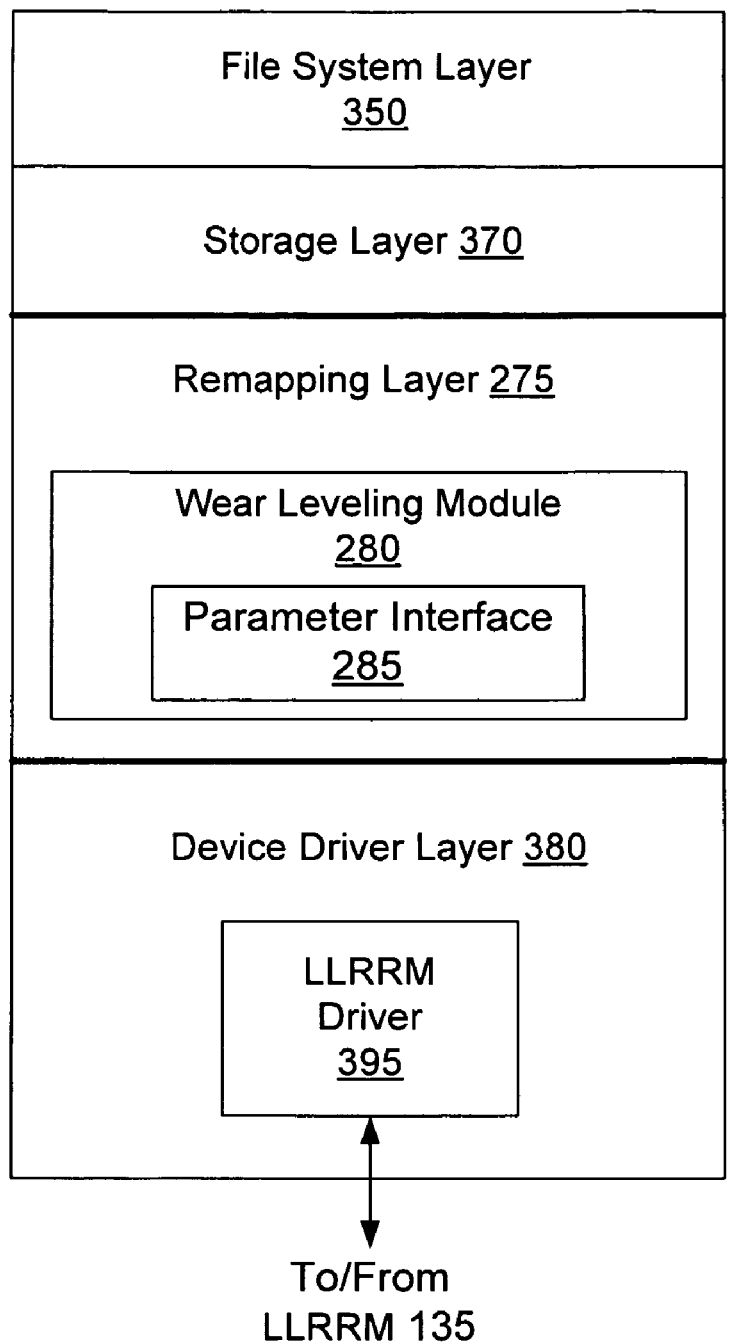
FIG. 4 shows a conceptual diagram of a remapping layer and wear leveling module within the storage operating system.

When using LLRRM devices 135 as storage devices, the storage operating system 300 may further implement a remapping layer 275 that maps/translates storage system addresses to LLRRM addresses. In some embodiments, the remapping layer 275 operates in conjunction with the other software layers and file system of the storage operating system 300 to use an LLRRM device 135 as a storage device in the storage system 120. The remapping layer 275 may reside between various software layers of the storage operating system 300. FIG. 4 shows a conceptual diagram of an example where the remapping layer 275 resides between the storage layer 370 and the device driver layer 380 of the storage operating system 300. In other embodiments, the remapping layer 275 resides between other software layers of the storage operating system 300. In some embodiments, the remapping layer 275 and/or device driver layer 380 may reside on the LLRRM device 135.

The device driver layer 380 may be used to help perform the functions of the remapping layer 275. The device driver layer 380 may receive commands (e.g., read page, write page, erase block), LLRRM addresses, data size, and any data blocks to be written at the LLRRM addresses from the remapping layer 275. The device driver layer 380 may use the LLRRM addresses to locate and access particular storage locations on an LLRRM device 135 and perform the received commands. The device driver layer 380 may comprise different device drivers for different devices. When using LLRRM devices 135 as storage devices, the device driver layer 380 may comprise an LLRRM driver 395 configured for accessing requested storage locations on the LLRRM devices 135. For read commands, the device driver layer 380 accesses the appropriate data on the LLRRM devices 135 and loads requested data in memory 240 for processing by the storage system 120. Upon successful completion of the request, the storage operating system returns a response to the server system 110 over the network 150.

In the example of FIG. 4, the remapping layer 275 may receive as input access-request information regarding a read or write request from the storage layer 370. The access-request information may include, for example, a request descriptor (e.g., read or write), a storage system address (e.g., LBN), and data size. The storage system address may specify a data block that is the starting point from which data is to be read or written. The data size may specify the amount of data to be read or written starting from the storage system address. For write requests, the remapping layer 275 may also receive as input from the storage layer 370 the data to be written at the storage system address.

In general, for a received read request, the remapping layer 275 may receive as input (from the storage layer 370) storage system addresses, remap the storage system addresses to LLRRM addresses using the remapping data structures, and output the LLRRM addresses to the device driver layer 380 for retrieval of the requested data. In general, for a received write request, the remapping layer 275 may receive as input (from the storage layer 370) storage system addresses and client data blocks to be written, store the client data blocks to LLRRM addresses in an LLRRM device 135, and update the remapping data structures to reflect the storing of the client data blocks to the LLRRM addresses.

B. Overview of LLRRM Devices

A brief overview of the storage architecture of LLRRM devices 135 is provided. In the embodiments below, the description and terms (e.g., "erase-unit," "page," etc.) commonly applied to flash memory devices may be used. The description and terms used below, however, should not be narrowly construed to apply only to flash memory devices. As such, the below embodiments may be applied to any LLRRM device.

Figure 5:
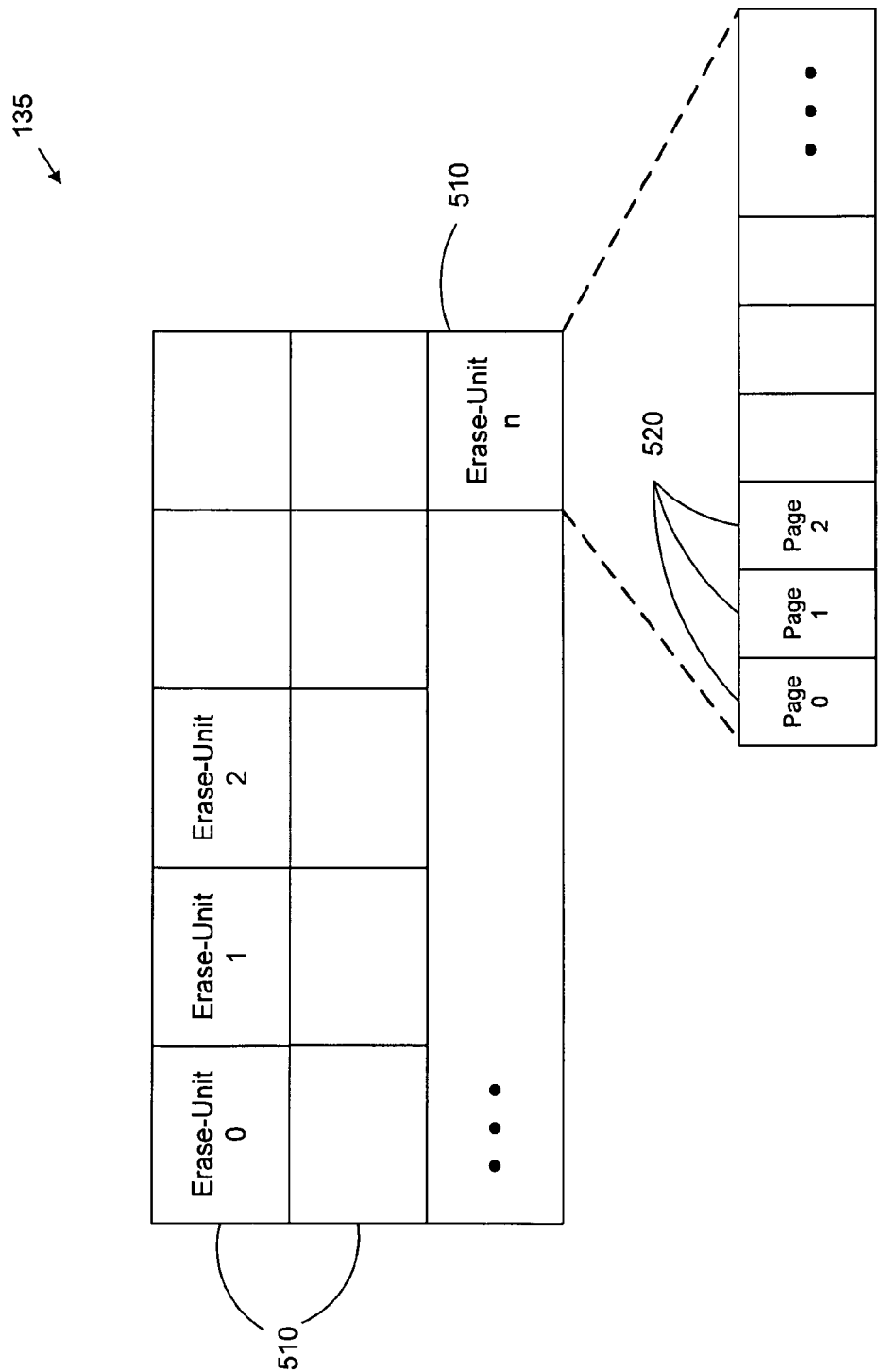
FIG. 5 shows a conceptual diagram of the storage architecture of an LLRRM device.

FIG. 5 shows a conceptual diagram of the storage architecture of a generic LLRRM device 135. As shown in the example of FIG. 5, the storage space of the LLRRM device 135 may be partitioned/divided into a plurality of erase-units 510. The storage space of each erase-unit 510 may also be partitioned/divided into a plurality of pages 520. Although the terms "erase-unit" and "page" are used in some embodiments, these terms should not be construed narrowly. In general, as used herein, an "erase-unit" may indicate a sub-portion of the storage space of an LLRRM device 135, and a "page" may indicate a sub-portion of the storage space of an erase-unit 510. As used herein, an erase-unit having at least one page that contains client data is referred to as an "active" erase-unit, whereas an erase-unit not having at least one page that contains client data is referred to as an "free" erase-unit.

Each page 520 of an erase-unit 510 may be configured for storing a predetermined amount of data. A page may comprise a fixed-sized amount of data that comprises the smallest amount of storage space that may be accessed (read or written) on an LLRRM device 135. For example, an erase-unit 510 may be 128 KB in size and contain 32 pages 520, each page 520 comprising a 4 KB data block. Each page 520 in an LLRRM device 135 has an associated LLRRM address that uniquely identifies the storage location of the page 520 in the LLRRM device 135. The LLRRM address of a page may be expressed in different forms. For example, an LLRRM address may comprise an erase-unit number and a page offset number (e.g., erase-unit 2, page offset 3) that uniquely identifies the location of a page 520. As a further example, an LLRRM address may comprise an absolute page number (e.g., page number 235) that uniquely identifies a page offset location from the beginning of the LLRRM device 135 (e.g., where each page is numbered from first page 0 and incrementing to the last page n in the LLRRM device 135). In other embodiments, LLRRM addresses are expressed in a different form than those listed here.

Client data may be written/stored to pages 520 of an erase-unit 510 until the erase-unit is filled. An erase-unit 510 containing client data is referred to as an active erase-unit (and may be listed in the active WC table) and an erase-unit 510 not containing client data is referred to as a free erase-unit (and may be listed in the free WC table). Note that active erase-units having client data will be listed in a remapping data structure (discussed further below) so that client applications can access the active erase-units, whereas free erase-units will not be listed in the remapping data structure.

After an active erase-unit 510 is "filled" (i.e., after new data is written to the last available page of the erase-unit), new client data may be received for a particular page in the active erase-unit 510. For conventional LLRRM devices, before a previously written page can be overwritten with new client data, the page 520 must first be erased before it can be written to again. Also, for conventional LLRRM devices, a single page can not be erased and written to with new data. Rather, the entire active erase-unit in which the page resides must typically be erased before the new client data can be written to the particular page.

To do so, client data from all pages of the active erase-unit 510 may be copied out to a temporary buffer (such as a fixed-size write-buffer). Note that typically the contents of only the pages storing client data is copied out, whereas the contents of pages not having valid client data is not copied out. After all client data is copied out, all pages of the active erase-unit may then be erased, and then the copied out client data may be written back into their respective pages in the active erase-unit, except for the old client data in the particular page to be overwritten where the new client data is written to the particular page.

Alternatively, a different write/erase method may be used that avoids use of a buffer. In the alternative method, a free erase-unit 510 may be allocated for storing the data of the active erase-unit 510. For example, the free erase-unit 510 may be selected from the free WC table that contains a list of all unallocated free erase-units. The client data from all pages 520 of the active erase-unit 510 is then copied out to the respective pages in the allocated free erase-unit 510, except for the old client data in the particular page to be overwritten where the new client data is written to the respective page in the free erase-unit 510. All pages of the active erase-unit may then be erased (which increases the wear count of the active erase-unit). The active erase-unit may be added to the free WC table (since it no longer stores client data) and the free erase-unit may be added to the active WC table (since it now stores client data).

C. Remapping Data Structure

As described above, client data may be continually moved/copied out to different erase-units of an LLRRM device 135 (e.g., from an active erase-unit 510 to an allocated free erase-unit 510) as new client data is received. A particular client data may have an associated storage system address (e.g., LBN) assigned by the storage operating system and an associated LLRRM address (e.g., erase-unit identifier and page number) where the particular client data is stored on the LLRRM device 135. As the client data is moved to different erase-units of an LLRRM device 135, the remapping layer 275 may track the changes in the LLRRM addresses using a remapping data structure. The remapping layer 275 may then use the remapping data structure to map/translate storage system addresses to LLRRM addresses.

FIG. 6 shows a conceptual diagram of an example of a remapping data structure 610 used to map a storage system address to an LLRRM address. As used herein, a remapping data structure may comprise any container or object for organizing and storing remapping data (such as a table, file, etc.). The remapping data structure 610 may be loaded/cached in memory 240 (as shown in FIG. 2) or stored in a non-volatile memory device (such as NVRAM 245). As used in the below description and figures, a storage system address may be represented by "LBN," but in other embodiments, a storage system address may be represented in a different form. Likewise, an LLRRM address may be represented by "Page" and/or "Erase-unit" but in other embodiments, an LLRRM address may be represented in a different form.

As shown in FIG. 6, the remapping data structure 610 comprises a plurality of remapping entries 615, each remapping entry 615 comprising an LBN range and a corresponding erase-unit identifier. The erase-unit identifier indicates which erase-unit 510 client data having an associated LBN within the corresponding LBN address range is stored. For example, client data having an associated/assigned LBN within the 100-199 LBN address range is stored in erase-unit 3 in the LLRRM device 135.

As new client data is received and/or client data is moved/copied out to different erase-units (e.g. during performance of wear leveling) of an LLRRM device 135, the remapping layer 275 may update the remapping data structure 610 to reflect the changes in storage locations. For example, if the client data of active erase-unit 3 is copied out to free erase-unit 8, the remapping layer 275 may update the remapping data structure 610 to reflect the new storage location of the client data (where the 100-199 LBN address range then corresponds to erase-unit 8).

In the example of FIG. 6, the storage area of the LLRRM device is divided into a logical-block number (LBN) space comprising a plurality of contiguous fixed-sized ranges (e.g., a fixed LBN range of 100). Each fixed-sized LBN range maps to a single erase-unit in the LLRRM device. This provides a simple address remapping scheme that is used herein for illustrative purposes only. In other embodiments, the storage system may implement any variety of address remapping schemes and/or any variety of remapping data structures known in the art. Whichever type of remapping scheme and/or remapping data structure may be used, in some embodiments, during wear leveling client data may be moved/copied out to different erase-units of the LLRRM device and the remapping scheme may update the remapping data structure to reflect the change in storage location to the different erase-units.

III. Performing Wear Leveling on Selected Erase-Units

Described herein are method and apparatus for providing wear leveling of erase-units of the LLRRM device that considers all active erase-units (having client data). In some embodiments, all active erase units of an LLRRM device are considered to determine active erase-units that have been erased/written relatively infrequently (referred to as "low-wear" active erase-units). Also determined are free erase-units (not having client data) that have been erased/written relatively frequently (referred to as "high-wear" free erase-units). In these embodiments, wear leveling may be performed on pairs of "low-wear" active erase-units and "high-wear" free erase-units by transferring the client data of the active erase-units to the free erase-units.

As discussed above, the LLRRM device 135 may comprise a plurality of erase-units, each erase-unit having an associated identifier that uniquely identifies the erase-unit within the LLRRM device. For example, the erase-units may be sequentially numbered (e.g., 0, 1, 2, etc.) from a first erase-unit to a last erase-unit of the LLRRM device, the sequential numbers comprising unique identifiers associated with the erase-units. Each erase-unit may also have an associated wear count that indicates the number of times the erase-unit has been erased (i.e., the current number of erase cycles performed on erase-unit).

A. Active and Free WC Tables

Figure 7:
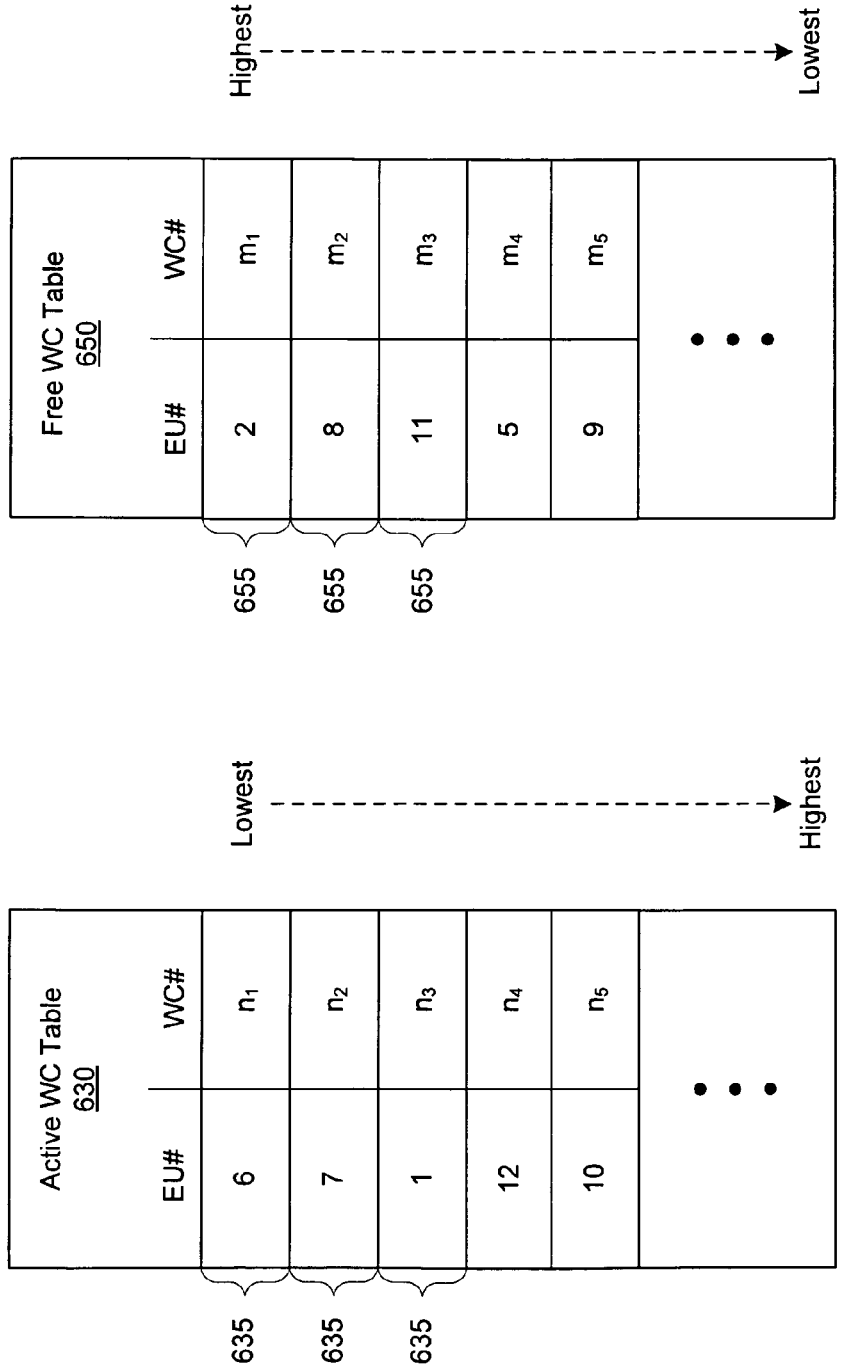
FIG. 7 shows a conceptual diagram of active and free wear count tables.

In some embodiments, the wear leveling module produces and maintains a wear-count table for active erase-units (referred as the "active WC table") and a wear-count table for free erase-units (referred as the "free WC table"). FIG. 7 shows a conceptual diagram of an exemplary active WC table 630 and an exemplary free WC table 650. As shown in FIG. 2, the active and free WC tables may be loaded/cached in memory 240 or stored in NVRAM 245 or other non-volatile memory device (such as primary storage device 125 or LLRRM 135). Although described below as tables, active and free WC tables may comprise any container or object for organizing and storing data (such as a data structure, file, etc.). For example, the active and free WC tables may comprise active and free WC data structures in other embodiments.

As shown in the example of FIG. 7, the active WC table 630 comprises a plurality of entries 635, an entry being produced for each active erase-unit (containing client data) in the LLRRM device 135. For each active erase-unit, an entry 635 may comprise the identifier associated with the active erase-unit (indicated by "EU#") and the wear count value associated with the active erase-unit (indicated by "WC#"). Similarly, the free WC table 650 comprises a plurality of entries 655, an entry being produced for each free erase-unit (not containing client data) in the LLRRM device. For each free erase-unit, an entry 655 may comprise the identifier associated with the free erase-unit (indicated by "EU#") and the wear count value associated with the free erase-unit (indicated by "WC#"). Note that the wear counts of active erase-units in the active WC table 630 are represented by "n" (e.g., n1, n2, n3, etc.) and the wear counts of free erase-units in the free WC table 650 are represented by "m" (e.g., m1, m2, m3, etc.).

In some embodiments, the entries in the active and free WC tables are sorted/listed in order according to wear count values. In some embodiments, the entries 635 in the active WC table 630 may be sorted in ascending wear count order (where entries 635 are listed from lowest wear count to highest wear count). In some embodiments, the entries 655 in the free WC table 650 may be sorted in descending wear count order (where entries 655 are listed from highest wear count to lowest wear count). In other embodiments, the entries in the active and free WC tables may be sorted in a different order according to wear count values. In further embodiments, the entries in the active and free WC tables may not be sorted according to wear count values.

As new write requests with new client data are received, processed and performed by the storage operating system 300, the wear leveling module 280 may operate in conjunction with the remapping layer 275 to use and maintain/update the active and free WC tables and the remapping data structure 610. For example, free erase-units from the free WC table 650 may be allocated for storing the new client data, the active and free WC tables may be updated to reflect when free erase-units are changed to active erase-units and when active erase-units are changed to free erase-units (such as when client data is deleted), wear counts of active or free erase-units in the WC tables may be incremented as erase cycles are performed prior to writing client data, the entries in the active and free WC tables may be continually sorted according to wear count values, and the remapping data structure 610 continually updated to reflect new remappings of new or moved storage locations of client data.

The wear leveling module may then use the information in the active and free WC tables to: 1) determine when to initiate/trigger wear leveling; 2) select one or more pairs of active and free erase-units for wear leveling; and 3) determine when to stop wear leveling.

B. Initiating Wear Leveling

In some embodiments, wear leveling may be initiated when the variance of the wear counts of two predetermined wear counts (as determined using the active and free WC tables) exceeds a predetermined variance threshold. In some embodiments, wear leveling may be initiated when the difference/variance between the absolute lowest wear count ("LWC") and the absolute highest wear count ("HWC") in the active and free WC tables exceed a predetermined variance threshold (VTH), which is expressed in the equation:

$$(HWC-LWC)/HWC > VTH.$$

For example, wear leveling may be initiated when there is greater than a 20% variance between the absolute lowest wear count and the absolute highest wear count. Note that the absolute lowest and highest wear counts may both be associated with active erase-units (where both wear counts are listed in the active WC table 630), may both be associated with free erase-units (where both wear counts are listed in the free WC table 650), or may be associated with an active erase-unit and a free erase-unit (where one wear count is listed in the active WC table and the other is listed in the free WC table).

In other embodiments, wear leveling may be initiated when the variance between the lowest wear count of an active erase-unit ("LWCA") listed in the active WC table 630 and the highest wear count of a free erase-unit ("HWCF") listed in the free WC table 650 exceed a predetermined variance threshold, which is expressed in the equation:

$$(HWCF-LWCA)/HWCF > VTH.$$

In general, these two wear counts will likely represent the extremes of low and high wear in the LLRRM device, as the lowest wear count of an active erase-unit is likely the lowest wear count and the highest wear count of a free erase-unit is likely the highest wear count in the LLRRM device.

In other embodiments, wear leveling may be initiated when the variance between the average wear count of the active erase-units ("AWCA") determined from the active WC table 630 and the average wear count of free erase-units ("AWCF") determined from the free WC table 650 exceed a predetermined variance threshold, which is expressed in the equation:

$$(AWCF-AWCA)/AWCF > VTH.$$

In further embodiments, wear leveling may be initiated when a predetermined variance threshold (for two predetermined wear counts) has been exceeded and a predetermined wear indicator threshold has been exceeded, a wear indicator reflecting the total number of erase cycles performed on the LLRRM device. For example, wear leveling may be initiated when a predetermined variance threshold has been exceeded and the total number of erase cycles performed on the entire LLRRM device (comprising the wear indicator) has exceeded a predetermined total cycle threshold. As such, wear leveling may be initiated only after the LLRRM device has reached a particular wear level or "age" when wear distribution through the LLRRM device starts becoming an issue. Prior to the LLRRM device reaching the particular "age," wear leveling may not be a concern since only a relatively small number of erase cycles have been performed thus far and exceeding the maximum of an erase-unit may not be an issue. The total number of erase cycles performed on the entire LLRRM device may be determined by summing all the wear count values of all the erase-units in the active and free WC tables.

In other embodiments, the wear indicator comprises the average wear count or estimated average wear count of the erase-units of the LLRRM device. In these embodiments, wear leveling may be initiated when a predetermined variance threshold has been exceeded and the average wear count or estimated average wear count of the LLRRM device has exceeded a predetermined average wear threshold. The average wear count also reflects the "age" of the LLRRM device. The average wear count of the LLRRM device may be determined by averaging all the wear count values of all the erase-units in the active and free WC tables. For example, the estimated average wear count of the LLRRM device may be determined by averaging the lowest and highest wear count values in the active and free WC tables. As a further example, the estimated average wear count of the LLRRM device may be determined by averaging all the lowest wear count of an active erase-unit ("LWCA") listed in the active WC table 630 and the highest wear count of a free erase-unit ("HWCF") listed in the free WC table 650. In further embodiments, the wear indicator comprises other values that reflect the wear level and number of erase cycles performed on the LLRRM device.

In alternative embodiments, two or more different combinations of variance threshold values and wear indicator threshold values may be used to initiate wear leveling. In some embodiments, a first initiating combination may comprise a first variance threshold and a first wear indicator threshold and a second initiating combination may comprise a second variance threshold and a second wear indicator threshold, wherein the first and second variance thresholds comprise different values and the first and second wear indicator thresholds comprise different values. Wear leveling may be initiated if the conditions of either the first or second initiating combinations are met.

In some embodiments, the threshold values for the two or more initiating combinations are determined such that, as the variance threshold values decrease, the wear indicator threshold values increase. For example, the first initiating combination may comprise a variance threshold of 20% and a wear indicator threshold of 1000 total erase cycles and the second initiating combination may comprise a variance threshold of 15% and a wear indicator threshold of 5000 total erase cycles. As such, wear leveling may be initiated if the 20% wear variance and 1000 total erase cycles are exceeded or if 15% wear variance and 5000 total erase cycles are exceeded.

C. Performing Wear Leveling on Selected Erase-Units

Once wear leveling is initiated/triggered, the wear leveling module 280 may then use the information in the active and free WC tables to select one or more pairs of erase-units for wear leveling. In some embodiments, wear leveling may be performed on an active erase-unit selected from the active WC table 630 and a free erase-unit selected from the free WC table 650 where client data from the active erase-unit is copied out to the free erase-unit. As such, use of a write buffer may be avoided.

In some embodiments, wear leveling may be performed on a pair of erase-units comprising an active erase-unit with the lowest wear count in the active WC table 630 and a free erase-unit with the highest wear count in the free WC table 650. For example, in FIG. 7, active erase-unit 6 is the active erase-unit with the lowest wear count in the active WC table 630 and free erase-unit 2 is the free erase-unit with the highest wear count in the free WC table 650.

Figure 8:
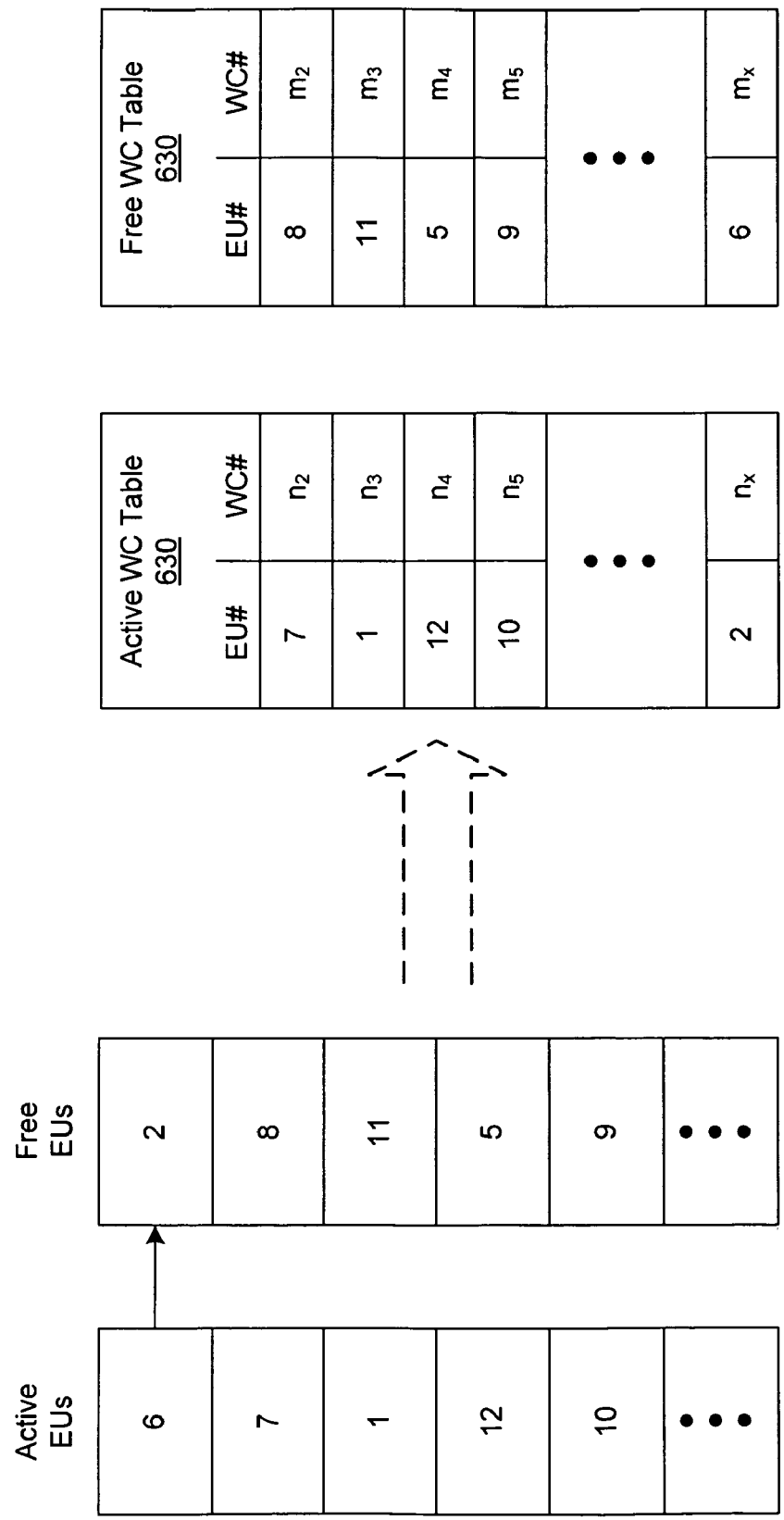
FIG. 8 shows a conceptual diagram of wear leveling processes that are performed on a pair of erase-units.

FIG. 8 shows a conceptual diagram of wear leveling processes that are performed on a pair of erase-units selected from the WC tables of FIG. 7. In the example of FIG. 8, wear leveling is performed on active erase-unit 6 and free erase-unit 2. After free erase-unit 2 is allocated to active erase-unit 6, client data of the active erase-unit 6 is copied to the free erase-unit 2. Erase-unit 6 is then erased and its associated wear count is incremented by one. The wear leveling module 280 then converts the active erase-unit 6 to a free erase-unit by removing its entry 635 (comprising its associated identifier and wear count) from the active WC table 630 and adding the entry 655 to the free WC table 650. The wear leveling module 280 also converts the free erase-unit 2 to an active erase-unit by removing its entry 655 (comprising its associated identifier and wear count) from the free WC table 650 and adding the entry 635 to the active WC table 630.

The wear leveling module 280 also re-sorts the entries of the active and free WC tables according to the wear count values. As shown in the example of FIG. 8, the entry for free erase-unit 6 will likely be listed towards the bottom of the free WC table 650 since the wear count of free erase-unit 6 will likely be relatively low in value. The entry for active erase-unit 2 will also likely be listed towards the bottom of the active WC table 630 since the wear count of active erase-unit 2 will likely be relatively high in value. The remapping layer 275 will update the remapping data structure 610 to reflect that the client data of erase-unit 6 is now stored in erase-unit 2 (whereby the LBNs that previously mapped to erase-unit 6 will now map to erase-unit 2).

Figure 9:
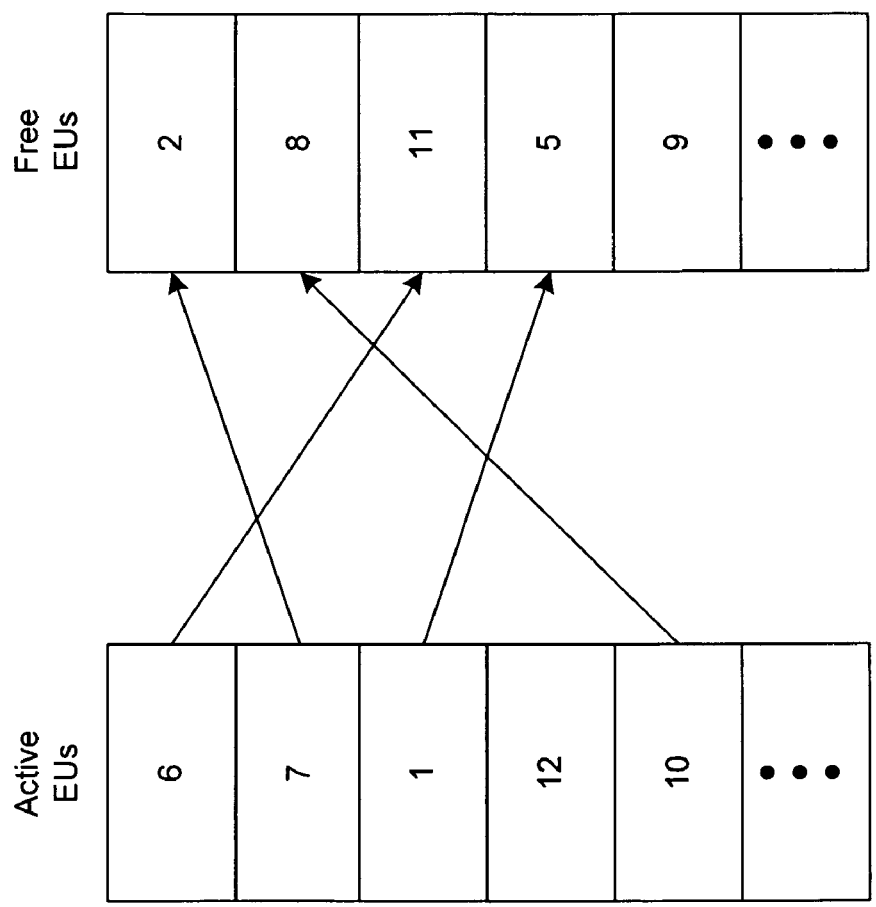
FIG. 9 shows a conceptual diagram of pairs of erase-units selected for wear leveling.

In other embodiments, pairs of erase-units selected for wear leveling may be selected according to different criterion. For example, in other embodiments, a pair of erase-units selected for wear leveling may comprise any active erase-unit with a relatively low wear count in the active WC table 630 (such as a wear count within the lowest 10% of wear counts) paired with any free erase-unit with a relatively high wear count in the free WC table 650 (such as a wear count within the highest 10% of wear counts). FIG. 9 shows a conceptual diagram of pairs of erase-units selected for wear leveling that comprise active erase-units with relatively low wear counts paired with free erase-units with relatively high wear counts. For example, active erase-unit 1 is within the lowest 10% of wear counts in the active WC table 630 and is paired with free erase-unit 5 is within the highest 10% of wear counts in the free WC table 650 (whereby the client data of active erase-unit 1 is copied out to free erase-unit 5).

D. Stopping Wear Leveling

FIG. 8 shows the processes that are performed during one iteration of the wear leveling procedure on one pair of selected erase-units (selected using the active and free WC tables). Wear leveling may continue to be performed on pairs of erase-units until a predetermined termination event occurs. In some embodiments, the wear leveling module 280 may use the information in the active and free WC tables to determine when the predetermined termination event occurs. After each iteration of the performance of the wear leveling, the wear leveling module 280 may check to determine if the predetermined termination event has occurred, and if so, to stop the performance of the wear leveling.

In some embodiments, wear leveling may be stopped when the variance between two predetermined wear counts in the active and free WC tables becomes equal to or less than a predetermined variance threshold (which comprises the termination event). For example, wear leveling may continue on selected pairs of erase-units until the variance between the absolute lowest wear count LWC and the absolute highest wear count HWC in the active and free WC tables becomes equal to or less than the predetermined variance threshold VTH (which comprises the termination event), which is expressed in the equation:

$$(HWC-LWC)/HWC<VTH.$$

In other embodiments, wear leveling may continue on selected pairs of erase-units until the variance between the lowest wear count of an active erase-unit LWCA listed in the active WC table 630 and the highest wear count of a free erase-unit HWCF listed in the free WC table 650 becomes equal to or less than the predetermined variance threshold VTH (which comprises the termination event), which is expressed in the equation:

$$(HWCF-LWCA)/HWCF<VTH.$$

In some embodiments, wear leveling may continue on selected pairs of erase-units until the variance between the average wear count of the active erase-units AWCA determined from the active WC table 630 and the average wear count of free erase-units AWCF determined from the free WC table 650 becomes equal to or less than the predetermined variance threshold VTH (which comprises the termination event), which is expressed in the equation:

$$(AWCF-AWCA)/AWCF<VTH.$$

Figure 10:
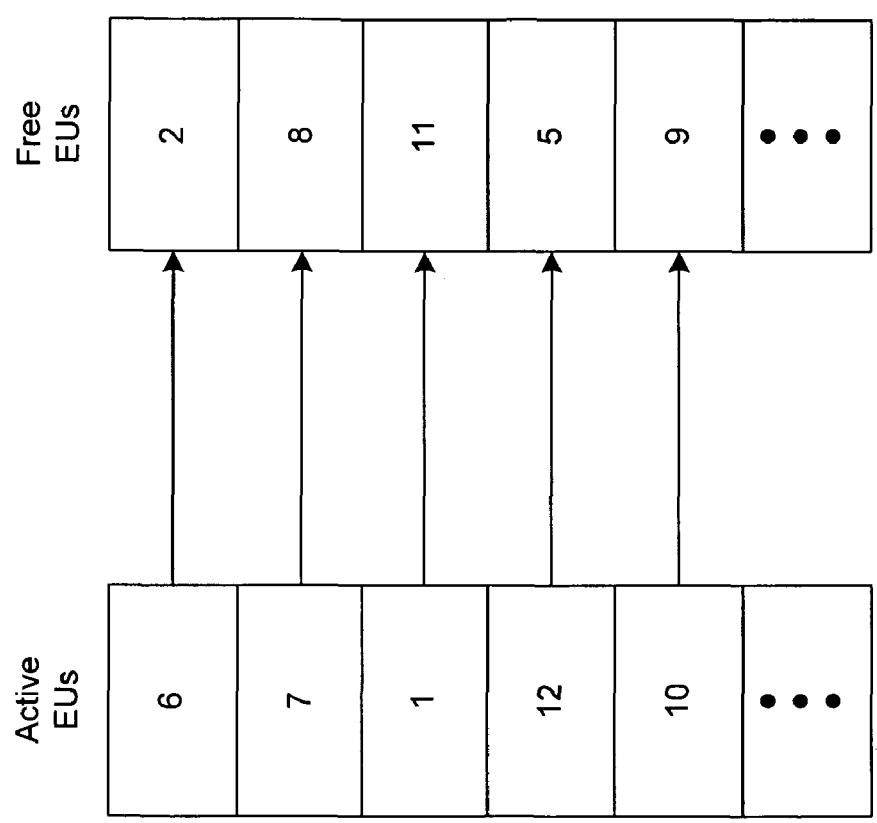
FIG. 10 shows a conceptual example where wear leveling is performed until a predetermined termination event occurs.

FIG. 10 shows a conceptual example where wear leveling is performed until the predetermined termination event occurs, the occurrence of the termination event being determined using the active and free WC tables. For example, the wear leveling may continue for 5 iterations on the active erase-unit having the lowest wear count LWCA and the free erase-unit having the highest wear count HWCF when it is then determined that the variance between these values becomes equal to or less than the predetermined variance threshold VTH (which comprises the termination event). As a result, as shown in the example of FIG. 10, wear leveling is performed on 5 pairs of erase-units comprising the 5 active erase-units having the lowest wear counts which are paired, respectively, with the 5 free erase-units having the highest wear counts.

In other embodiments, the wear leveling module 280 may determine the predetermined termination event using other means. For example, the wear leveling may continue until wear leveling has been performed a predetermined number of iterations on a predetermined number of erase-unit pairs (which comprises the termination event). For example, FIG.

10 may also show a conceptual example where wear leveling is performed for 5 iterations on the active erase-unit having the lowest wear count and the free erase-unit having the highest wear count.

E. Parameter Interface

By initiating and stopping wear leveling based on a variance threshold, the maximum wear variance of the erase-units of the LLRRM device 135 may be bounded (as determined by the variance threshold). If the variance threshold is set to a relatively low value (e.g., 5-10%), the wear leveling will be initiated more often. However, performing wear leveling includes performing erase cycles on selected erase-units, thus increasing the wear count of the selected erase-units and also the average wear of the LLRRM device (i.e., the average wear count of all erase-units of the LLRRM device). Although a relatively small wear variance is desirable (as it indicates that wear is being evenly distributed in the LLRRM device), wear leveling should not be initiated and performed too often as this also increases the average wear of the LLRRM device. As such, the average wear should be taken into account when determining value of the variance threshold.

Experimentation may be done with different variance threshold values to determine a good balance between the decrease in wear variance and the increase in average wear of the LLRRM device. In some embodiments, the wear leveling module 280 comprises a parameter interface 285 (as shown in FIG. 4) for receiving one or more wear leveling configuration parameters to dynamically change the wear leveling functions of the wear leveling module 280 (and without requiring the software code of the wear leveling module 280 to be modified). In some embodiments, the configuration parameters may be received from a user through the parameter interface 285 which comprises a user interface (such as, a graphical user interface or command line interface). For example, configuration parameters may include one or more values for the predetermined variance threshold and/or the predetermined wear indicator threshold (e.g., total number of erase cycles, average wear count, estimated average wear count, etc.) which may be dynamically changed and fine tuned.

F. Re-Circulating Low-Wear Active Erase Units

Active erase-units that have been erased/written relatively infrequently have relatively low wear counts and are referred to as "low-wear" active erase-units. The current rate of wear (reflected by the number of erase cycles over time) for a low-wear active erase-unit will also be relatively low and the future rate of wear will also likely be relatively low. Free erase-units that have been erased/written relatively frequently have relatively high wear counts and are referred to as "high-wear" free erase-units. The current rate of wear for a high-wear free erase-unit will also be relatively high.

As described above, in some embodiments, the data contents of low-wear active erase-units are transferred/copied out to high-wear free erase-units. Thus a low-wear active erase-unit may be converted to a free erase-unit that may later store different client data, which puts the low-wear active erase-unit back into circulation for use in the LLRRM device. This also may increase the current rate of wear for the erase-unit since it will now store different client data which may be accessed more frequently. Further, the high-wear free erase-unit may be converted to an active erase-unit that stores client data that is infrequently erased/written, which may thereby reduce the current rate of wear for the erase-unit. As such, some embodiments herein spread wear more evenly among erase-units by reducing the current wear rate of low-wear active erase-units and increasing the current wear rate of high-wear free erase-units.

Due to the maximum wear characteristics of erase-units of an LLRRM device, wear leveling may used to help distribute wear (i.e., the number of erase cycles) evenly among the erase-units to preserve the full storage size of the LLRRM device. In some embodiments, a wear leveling method is provided that converts low-wear active erase-units (having relatively low wear counts) to free erase-units that may later store different client data, which may thereby increase the current rates of wear for these erase-units. Further, high-wear free erase-units (having relatively high wear counts) may be converted to active erase-units that store client data that are infrequently erased/written, which may thereby reduce the current rates of wear for these erase-units. As such, some embodiments herein spread wear more evenly among erase-units by reducing the current wear rates of low-wear active erase-units and increasing the current wear rates of high-wear free erase-units.

G. Method for Performing Wear Leveling

Figure 11:
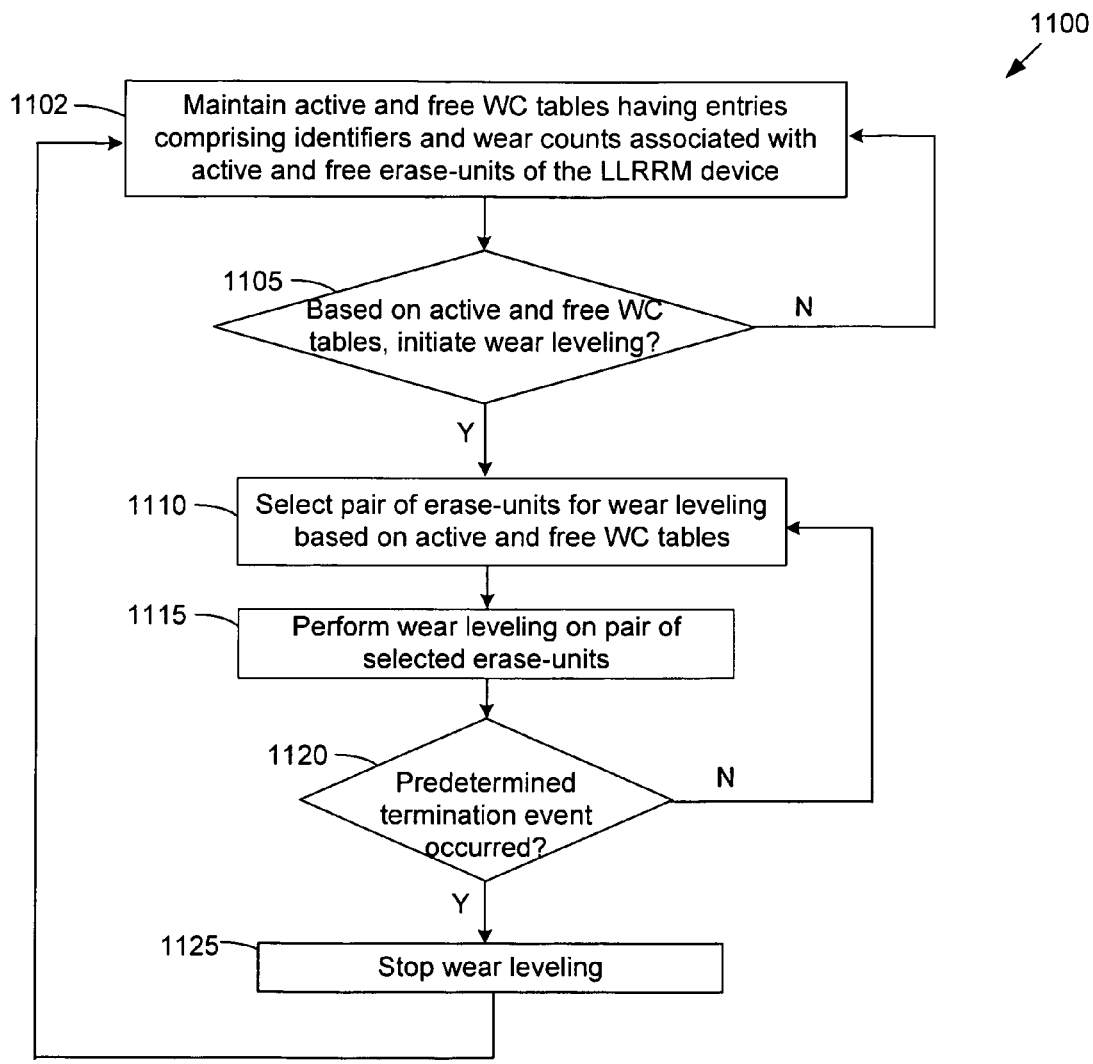
FIG. 11 is a flowchart of a method for performing wear leveling on erase-units of an LLRRM device.

FIG. 11 is a flowchart of a method 1100 for performing wear leveling on erase-units of an LLRRM device. In some embodiments, some of the steps of the method 1100 are implemented by software or hardware. In some embodiments, some of the steps of method 1100 are performed by the wear leveling module 280 in conjunction with the remapping layer 275. The order and number of steps of the method 1100 are for illustrative purposes only and, in other embodiments, a different order and/or number of steps are used.

The method 1100 begins by producing and maintaining (at step 1102) an active WC table for active erase-units (having entries comprising identifiers and wear counts associated with active erase-units) and a free WC table for free erase-units (having entries comprising identifiers and wear counts associated with free erase-units) of the LLRRM device. The entries in the active and free WC tables may be listed in order according to wear count values.

Using the information in the active and free WC tables, the method then determines (at step 1105) whether to initiate/trigger wear leveling. If so, the method continues at step 1110. If not, the method continues at step 1102. For example, the method 1100 may initiate wear leveling when the variance of two predetermined wear counts (e.g., the absolute lowest wear count and the absolute highest wear count, the lowest wear count of an active erase-unit and the highest wear count of a free erase-unit, the average wear count of the active erase-units and the average wear count of free erase-units, etc.) exceeds a predetermined variance threshold. In alternative embodiments, wear leveling may be initiated when the predetermined variance threshold (for two predetermined wear counts) has been exceeded and a predetermined wear indicator threshold (e.g., total number of erase cycles, average wear count, estimated average wear count, etc.) has been exceeded. In further embodiments, wear leveling may be initiated when the conditions of one of two or more different combinations of variance threshold values and wear indicator threshold values are met.

Using the information in the active and free WC tables, the method 1100 then selects (at step 1110) a pair of erase-units (e.g., an active erase-unit selected from the active WC table and a free erase-unit selected from the free WC table) for wear leveling. In some embodiments, the selected pair of erase-units comprises an active erase-unit with the lowest wear count and a free erase-unit with the highest wear count in the free WC table. In other embodiments, the selected pair of erase-units comprises an active erase-unit with a relatively low wear count (such as a wear count within the lowest 10% of wear counts) and a free erase-unit with a relatively high wear count (such as a wear count within the highest 10% of wear counts).

The method then performs (at step 1115) wear leveling on the pair of selected erase-units (e.g., by allocating the free erase-unit to the active erase-unit, copying out client data of the active erase-unit to the free erase-unit, erasing the active erase-unit and incrementing its associated wear count, removing the entry for the active erase-unit from the active WC table and adding it to the free WC table, removing the entry for the free erase-unit from the free WC table and adding it to the active WC table, re-sorting the entries of the active and free WC tables according to the wear count values, and updating the remapping data structure to reflect the change of storage location of the client data).

The method 1100 then determines (at step 1120) whether a predetermined termination event has occurred (e.g., by using the information in the active and free WC tables). In some embodiments, wear leveling may be stopped when the variance between two predetermined wear counts (e.g., the absolute lowest wear count and the absolute highest wear count, the lowest wear count of an active erase-unit and the highest wear count of a free erase-unit, the average wear count of the active erase-units and the average wear count of free erase-units, etc.) becomes equal to or less than a predetermined variance threshold (which comprises the termination event). In other embodiments, the method 1100 may continue wear leveling a predetermined number of iterations on a predetermined number of erase-unit pairs (which comprises the termination event).

If the method determines (at step 1120—No) that the predetermined termination event has not occurred, the method continues at step 1110. If the method determines (at step 1120—Yes) that the predetermined termination event has occurred, the method stops (at 1125) the performance of the wear leveling. The method then continues at step 1102.

Some embodiments may be conveniently implemented using a conventional general purpose or a specialized digital computer or microprocessor programmed according to the teachings of the present disclosure, as will be apparent to those skilled in the computer art. Appropriate software coding may readily be prepared by skilled programmers based on the teachings of the present disclosure, as will be apparent to those skilled in the software art. Some embodiments may also be implemented by the preparation of application-specific integrated circuits or by interconnecting an appropriate network of conventional component circuits, as will be readily apparent to those skilled in the art.

Some embodiments include a computer program product which is a storage medium (media) having instructions stored thereon/in which may be used to control, or cause, a computer to perform any of the processes of an embodiment described herein. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), some embodiments include software instructions for controlling both the hardware of the general purpose/specialized computer or microprocessor, and for enabling the computer or microprocessor to interact with a human user or other mechanism utilizing the results of an embodiment. Such software may include without limitation device drivers, operating systems, and user applications. Ultimately, such computer readable media further includes software for performing some embodiments, as described above. Included in the programming (software) of the general/specialized computer or microprocessor are software modules for implementing the teachings of some embodiments.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A storage system for storing client data, the storage system comprising:
   at least one low-latency random read memory (LLRRM) device, the LLRRM device comprising a plurality of active erase-units that store client data and a plurality of free erase-units that do not store client data;
   active and free wear count (WC) data structures, the active WC data structure comprising an entry for each active EU in the LLRRM device, the free WC data structure comprising a plurality of entries for a plurality of free EUs in the LLRRM device, each entry in the active and free WC data structures comprising a wear count associated with an EU, the wear count indicating a number of erase cycles performed on the EU; and
   a wear leveling module executed by a processor, the wear leveling module configured for:
     selecting a pair of EUs for performing wear leveling, the selected pair comprising an active EU and a free EU that are selected based on the information in the active and free WC data structures; and
     performing wear leveling on the selected pair by copying client data from the active EU to the free EU.

2. The storage system of claim 1, wherein the entries in the active and free WC data structures are sorted according to wear counts.

3. The storage system of claim 1, wherein the wear leveling module is further configured for:
   initiating wear leveling upon determining that a variance of two predetermined wear counts in the active and free WC data structures exceeds a predetermined variance threshold.

4. The storage system of claim 3, wherein the two predetermined wear counts comprise:
   an absolute lowest wear count and an absolute highest wear count in the active and free WC data structures;
   a lowest wear count in the active WC data structure and a highest wear count in the free WC data structure; or
   an average wear count of the active EUs in the active WC data structure and an average wear count of free EUs in the free WC data structure.

5. The storage system of claim 3, wherein the wear leveling module comprises a parameter interface configured for:
   receiving a plurality of values for the predetermined variance threshold to dynamically change the predetermined variance threshold.

6. The storage system of claim 1, wherein the wear leveling module is further configured for:
   initiating wear leveling upon determining that a variance of two predetermined wear counts in the active and free WC data structures exceeds a predetermined variance threshold and a predetermined wear indicator threshold has been exceeded, a wear indicator reflecting a total number of erase cycles performed on the LLRRM device.

7. The storage system of claim 6, wherein the wear leveling module is further configured for:
   initiating wear leveling upon determining that conditions of one of two or more different combinations of predetermined variance thresholds and predetermined wear indicator thresholds are met.

8. The storage system of claim 1, wherein the selected pair comprises:
   an active EU having a wear count within the lowest 10% of wear counts in the active WC data structure and a free active EU having a wear count within the highest 10% of wear counts in the free WC data structure; or
   an active EU having a lowest wear count in the active WC data structure and a free active EU having a highest wear count in the free WC data structure.

9. The storage system of claim 1, wherein the wear leveling module is further configured for performing wear leveling on the selected pair of active and free EUs by:
   converting the active EU to a free EU by removing its entry from the active WC data structure and adding it to the free WC data structure; and
   converting the free EU to an active EU by removing its entry from the free WC data structure and adding it to the active WC data structure.

10. The storage system of claim 1, wherein the wear leveling module is further configured for:
    continuing to select pairs of EUs for performing wear leveling based on the information in the active and free WC data structures and performing wear leveling on the selected pairs until a predetermined termination event occurs, the occurrence of the predetermined termination event being determined using information in the active and free WC data structures.

11. The storage system of claim 10, wherein the predetermined termination event comprises a variance between two predetermined wear counts in the active and free WC data structures becoming equal to or less than a predetermined variance threshold.

12. The storage system of claim 10, wherein the two predetermined wear counts comprise:
    an absolute lowest wear count and an absolute highest wear count in the active and free WC data structures;
    a lowest wear count in the active WC data structure and a highest wear count in the free WC data structure; or
    an average wear count of the active EUs in the active WC data structure and an average wear count of free EUs in the free WC data structure.

13. The storage system of claim 1, wherein the LLRRM device comprises a non-volatile, rewridata structure solid state memory having lower latency in performing random write requests relative to disk devices.

14. A storage system for storing client data, the storage system comprising:
    at least one low-latency random read memory (LLRRM) device, the LLRRM device comprising a plurality of active erase-units that store client data and a plurality of free erase-units that do not store client data;
    active and free wear count (WC) data structures, the active WC data structure comprising an entry for each active EU in the LLRRM device, the free WC data structure comprising a plurality of entries for a plurality of free EUs in the LLRRM device, each entry in the active and free WC data structures comprising a wear count associated with an EU, the wear count indicating a number of erase cycles performed on the EU; and
    a wear leveling module executed by a processor, the wear leveling module configured for:
      initiating wear leveling upon determining that a variance of two predetermined wear counts in the active and free WC data structures exceeds a predetermined variance threshold; and
      upon wear leveling being initiated, performing wear leveling on a selected pair of EUs comprising an active EU and a free EU by copying client data from the active EU to the free EU.

15. The storage system of claim 14, wherein the two predetermined wear counts comprise:
    an absolute lowest wear count and an absolute highest wear count in the active and free WC data structures;
    a lowest wear count in the active WC data structure and a highest wear count in the free WC data structure; or
    an average wear count of the active EUs in the active WC data structure and an average wear count of free EUs in the free WC data structure.

16. The storage system of claim 14, wherein the selected pair comprises:
    an active EU having a wear count within the lowest 10% of wear counts in the active WC data structure and a free active EU having a wear count within the highest 10% of wear counts in the free WC data structure; or
    an active EU having a lowest wear count in the active WC data structure and a free active EU having a highest wear count in the free WC data structure.

17. The storage system of claim 14, wherein the wear leveling module is further configured for performing wear leveling on the selected pair of active and free EUs by:
    converting the active EU to a free EU by removing its entry from the active WC data structure and adding it to the free WC data structure; and
    converting the free EU to an active EU by removing its entry from the free WC data structure and adding it to the active WC data structure.

18. The storage system of claim 14, wherein the wear leveling module is further configured for:
    continuing to perform wear leveling on selected pairs of active and free EUs until a predetermined termination event occurs, the occurrence of the predetermined termination event being determined using information in the active and free WC data structures.

19. A storage system for storing client data, the storage system comprising:
    at least one low-latency random read memory (LLRRM) device, the LLRRM device comprising a plurality of active erase-units that store client data and a plurality of free erase-units that do not store client data;
    active and free wear count (WC) data structures, the active WC data structure comprising an entry for each active EU in the LLRRM device, the free WC data structure comprising a plurality of entries for a plurality of free EUs in the LLRRM device, each entry in the active and free WC data structures comprising a wear count associated with an EU, the wear count indicating a number of erase cycles performed on the EU; and
    a wear leveling module executed by a processor, the wear leveling module configured for:
      selecting for wear leveling an active EU having a wear count within the lowest 10% of wear counts in the active WC data structure and a free active EU having a wear count within the highest 10% of wear counts in the free WC data structure; and performing wear leveling by copying client data from the active EU to the free EU.

20. The storage system of claim 19, wherein the wear leveling module is further configured for:
initiating wear leveling upon determining that a variance of two predetermined wear counts in the active and free WC data structures exceeds a predetermined variance threshold.

21. The storage system of claim 19, wherein the wear leveling module is further configured for performing wear leveling on the selected pair of active and free EUs by:
converting the active EU to a free EU by removing its entry from the active WC data structure and adding it to the free WC data structure; and
converting the free EU to an active EU by removing its entry from the free WC data structure and adding it to the active WC data structure.

22. The storage system of claim 19, wherein the wear leveling module is further configured for:
continuing to select pairs of EUs for performing wear leveling based on the information in the active and free WC data structures and performing wear leveling on the selected pairs until a predetermined termination event occurs, the occurrence of the predetermined termination event being determined using information in the active and free WC data structures.

23. A method for performing wear leveling in a storage system for storing client data, the storage system comprising at least one low-latency random read memory (LLRRM) device, the LLRRM device comprising a plurality of active erase-units that store client data and a plurality of free erase-units that do not store client data, the method comprising:
maintaining active and free wear count (WC) data structures, the active WC data structure comprising an entry for each active EU in the LLRRM device, the free WC data structure comprising a plurality of entries for a plurality of free EUs in the LLRRM device, each entry in the active and free WC data structures comprising a wear count associated with an EU, the wear count indicating a number of erase cycles performed on the EU;
selecting a pair of EUs for performing wear leveling, the selected pair comprising an active EU and a free EU that are selected based on the information in the active and free WC data structures; and
performing wear leveling on the selected pair by copying client data from the active EU to the free EU.

24. The method of claim 23, further comprising:
initiating wear leveling upon determining that a variance of two predetermined wear counts in the active and free WC data structures exceeds a predetermined variance threshold.

25. The method of claim 24, wherein the two predetermined wear counts comprise:
an absolute lowest wear count and an absolute highest wear count in the active and free WC data structures;
a lowest wear count in the active WC data structure and a highest wear count in the free WC data structure; or
an average wear count of the active EUs in the active WC data structure and an average wear count of free EUs in the free WC data structure.

26. The method of claim 23, wherein the selected pair comprises:
an active EU having a wear count within the lowest 10% of wear counts in the active WC data structure and a free active EU having a wear count within the highest 10% of wear counts in the free WC data structure; or
an active EU having a lowest wear count in the active WC data structure and a free active EU having a highest wear count in the free WC data structure.

27. The method of claim 23, further comprising:
continuing to select pairs of EUs for performing wear leveling based on the information in the active and free WC data structures and performing wear leveling on the selected pairs until a predetermined termination event occurs, the occurrence of the predetermined termination event being determined using information in the active and free WC data structures.

\* \* \* \* \*